UNITED STATES PATENT OFFICE.

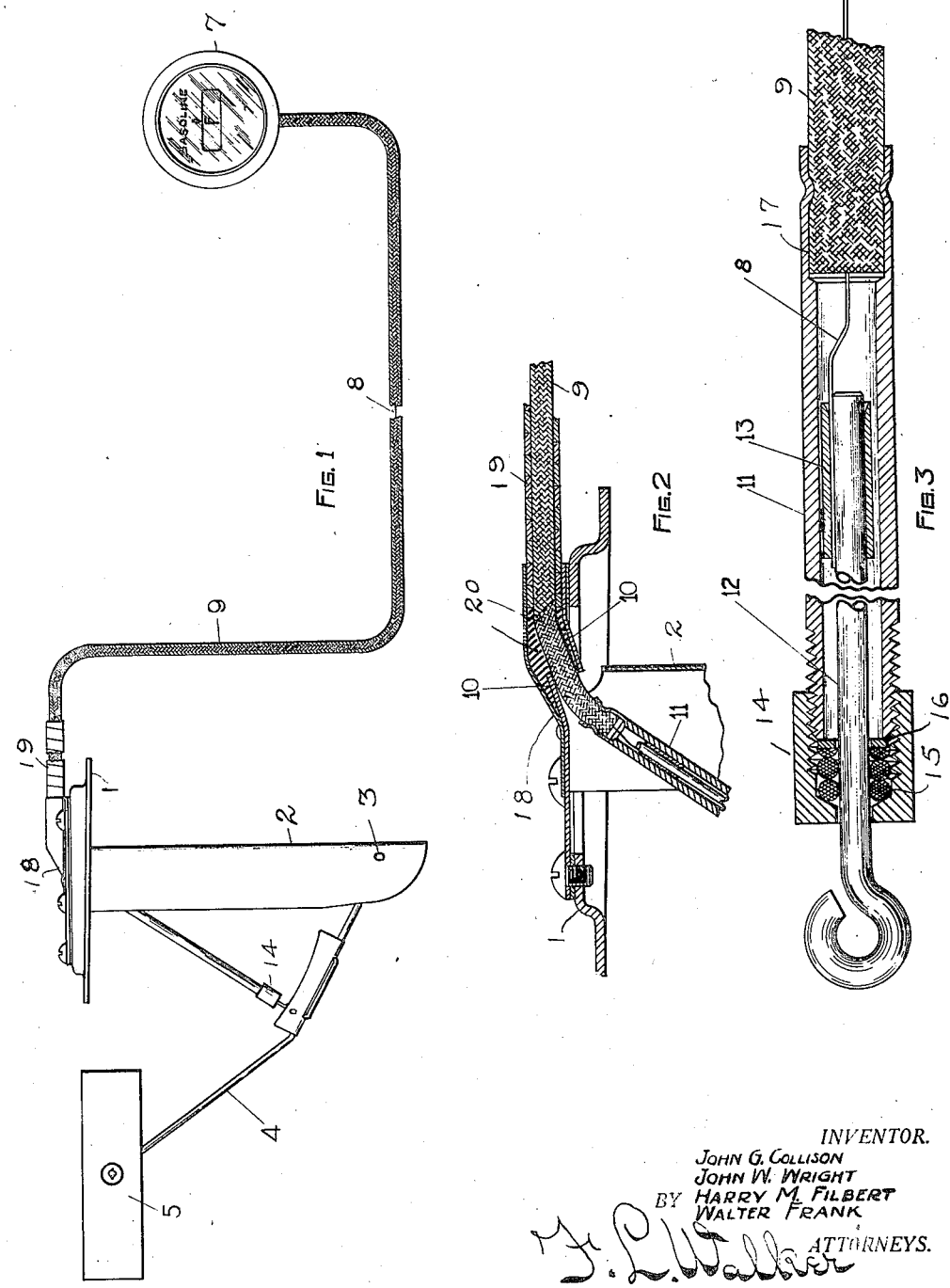

JOHN G. COLLISON, JOHN W. WRIGHT, AND HARRY M. FILBERT, OF DAYTON, AND WALTER FRANK, OF MIAMISBURG, OHIO, ASSIGNORS TO THE STEMCO ENGINEERING COMPANY, OF DAYTON, OHIO, A CORPORATION OF OHIO.

FLUID GAUGE.

1,423,191.   Specification of Letters Patent.   Patented July 18, 1922.

Application filed June 25, 1920.  Serial No. 391,709.

*To all whom it may concern:*

Be it known, that we, JOHN G. COLLISON, JOHN W. WRIGHT, and HARRY M. FILBERT, residing at Dayton, in the county of Montgomery and State of Ohio, and WALTER FRANK, residing at Miamisburg, in the county of Montgomery and State of Ohio, all citizens of the United States, have invented certain new and useful Improvements in Fluid Gauges, of which the following is a specification.

This invention relates to measuring instruments, and more particularly to fluid gauges of the float operated type, having distance indicating means by which variations of fluid level within a tank or container may be automatically indicated at a distant point in units of quantity or proportional parts. The present construction is an amplification of the device disclosed in our co-pending application Serial No. 381,168, and pertains particularly to means for controlling the surge of gasoline or other liquid in the guide tube, and for preventing the leakage or escape of the fluid through the flexible guide conduit.

It has been found in experience that the violent agitation of the liquid whether gasoline or other fluid within the tank due to the motion of the vehicle causes the fluid to surge within the dependent portions of the guide tube, and in the event of extreme vibration or tilting of the vehicle the fluid is propelled beyond the limit of the tank, through the tubular conduit, and also around the conduit through the opening in the mounting or head, through which the conduit passes, causing leakage of the fuel. This leakage is particularly noticeable when the fuel tank or container has been filled to an excessively high level or beyond the normal capacity of the tank.

To provide means for retarding the surge of liquid within the tube, and to provide a fluid proof packing for the guide tube and its point of entrance into the tank, and to seal the tube against leakage are primary objects of the present invention.

With the above primary and other incidental objects in view as will more fully appear in the specification, the invention consists of the features of construction, the parts and combination thereof and the mode of operation, or their equivalents, as hereinafter described and set forth in the claims.

Referring to the drawings, Fig. 1 is a side elevation of the float actuated indicating means removed from the tank, to which the present invention is applied. Fig. 2 is an enlarged detail view of the mounting for the guide tube and float actuated parts, illustrating the manner of packing the guide tube and its connection to eliminate leakage. Fig. 3 is an enlarged detail view of a portion of the tubular guide conduit and reciprocatory motion transmitting member therein, illustrating the manner of interconnecting the flexible and non-flexible sections of such guide tubes, and the anti-surge gland at the extremity of said tube.

Like parts are indicated by similar characters of reference throughout the several views.

Briefly described, the indicating mechanism comprises a closure head 1, for the tank or container from which projects a dependent hanger arm 2, to the lower end of which is pivoted at 3 an oscillatory float arm 4, carrying the actuating float 5. This float arm 4 is confined to a vertical plane of oscillation, and by its movement under varying levels of fluid within the tank serves to reciprocate a motion transmitting element by which is actuated a distantly located indicator 7, graduated to agree with various positions of the float 5 throughout its path of travel. The indicator 7 may be of any suitable or convenient type and the intermediate reciprocatory actuating member may be a flexible wire, a cord, cable, chain or other motion transmitting means. However, there is shown in the drawings, a flexible wire 8, capable of to and fro movement through a curvilinear path of travel within a flexible guide tube 9.

As ordinarily constructed this guide tube 9 comprises a helically wound wire enclosed in an envelope or covering, of braided textile or fabric. The end of this guide tube 9 is projected through the closure or end 1 of the tank unit, which for this purpose is provided with an orifice, the opposite sides or lips of which are deflected upward and downward as at 10 to afford a diagonally disposed passageway for the guide conduit 9. Attached to that portion of the flexible guide tube projecting within the tank or container is an inflexible tubular extension 11, within which reciprocates a comparatively stiff or inflexible rod 12, pivotally connected to the float arm 4 from which it derives its movement. The motion transmitting element 8 whether the same comprises a flexible wire, a cord or other means is connected to the extremity of the initial reciprocatory member 12, and extends through the tubular conduit 9 to the indicator 7, which it controls by its to and fro movement. Any suitable method of attachment of the flexible member 8 and the initial reciprocatory member 12 may be employed. In the drawings, this coupling is shown effected by means of a sleeve 13, enclosing the overlapping portion of the transmission wire 8 and the rod 12.

The particular construction of the indicator 7 and the character of the motion transmitting means per se, form no part of the present invention, and the construction thus far described is substantially that set forth and claimed in the co-pending application heretofore referred to. It will be understood that the fluid will normally stand within the tube 11, at a level uniform with that in the tank or container. However, upon a violent agitation of the tank and its contents, there is a tendency for that portion of the fluid confined within the tube to be projected upward in a forceible manner, which may carry it beyond the extremity of the tubular extension 11 and into the flexible conduit 9, passing therethrough in extreme cases beyond the confines of the tank. This condition is particularly true when the tank has been filled to its full capacity whereby the fluid will stand at an abnormally high level. To overcome this surging of the fluid within the guide tube, whereby it is propelled beyond the limit of the tank, there is provided at the lower or free end of the guide tube extension 11, an anti-surge gland comprising a cap 14, screw threaded upon the extremity of the guide tube extension 11, and enclosing a body 15 of soft packing material, preferably wicking or some like material, which bears against a collar 16 surrounding the reciprocatory rod 12, and resting against the end of the guide tube 11. It will be understood that the anti-surge gland is not intended to exclude the fluid from the tube 11, but will permit the fluid to rise in the tube to the uniform level of that of the tank or container, but will prevent or retard the rapid flow of the fluid into and out of the tube, with the vibrations of the tank. By thus retarding or controlling the surge of fluid in the tube, the height of the column of fluid therein may be confined to the flexible guide tube extension 11 and not propelled into the flexible conduit 9. It is to be understood that the anti-surge gland does not bind upon the reciprocatory rod 12, but permits the free reciprocation of such rod, therethrough in response to the slightest variation of the float 5. In other words the anti-surge gland at the end of the guide tube extension 11 merely reduces the orifice of said tube from a comparatively large opening equal to the internal bore of the tube to an orifice conforming approximately to the diameter of the reciprocatory initial rod 12.

As heretofore constructed, it has been the practice to denude a coil or helical wire forming the core of a flexible conduit 9, throughout that portion extending within the tank, and to engage this flexible conduit section with the inflexible tubular extension 11, by steering the denuded end of the coil into the internally screw threaded extremity of the tube, employing the convolutions of the coil as a screw thread. The exposure of the helical coil forming the core of the conduit 9, permitted the fluid to be driven between the convolutions of such exposed coil at the top of the tank, by the sloshing or surging of the fluid within the tank, and thence into the flexible conduit 9 from which it would leak beyond the tank wall. To overcome this difficulty, the upper end of the tubular extension 11 has been counter-bored as shown at 17, and the end of the guide tube 9, including its external envelope or cover has been inserted therein. The telescopically joined ends of the flexible conduit 9, and inflexible extension 11 are then united by peripherally crimping the counter-bored end of the tube 11 to contract the same upon the inserted end of the conduit 9, and to some extent embed a contracted portion in the envelope or covering of such flexible tube.

The counter-boring of the tubular extension 11 insures a close fit of the conduit 9 therein, and also affords surrounding walls of less thickness and hence more easily and uniformly crimped or indented into the enclosed end of the conduit 9. It will be obvious, however, that the connection as described may be effected without the initial counter-boring of the tubular extension 11. As a further precaution, the fabric or textile envelope or covering of the conduit 9 within the tank or container and for a suitable distance therebeyond is impregnated with a fluid proof sealing material. Inasmuch as the portion of the conduit 9 within the tank is subjected to a more or less constant flexing movement, due not only to the varying fluid level within the tank but to the surging or agitating of the tank contents acting upon the float 5, this impregnating or sealing material must not be brittle, but is necessarily of an elastic or yielding character.

The particular composition of the impregnating or sealing material will depend to some degree upon the character of the fuel or other material. In some instances, a coating of shellac will be found amply sufficient. However, for more general use, a flexible non-hardening composition embodying glue, glycerine, molasses or cellulose nitrate, or a composition containing rosin, or sugar, phenol, and sometimes with an addition of chloride calcium, may be desirable. Various combinations of two or more of the above mentioned ingredients may be employed to meet different conditions of use, and to resist the chemical attack of different liquids. By impregnating or saturating the envelope or covering of the helical conduit core, any entrance of the fluid from the exterior to the interior of the flexible conduit, above the attached end of the tubular extension 11 is prevented, and by so sealing the flexible conduit 9, for a distance beyond its connection with the unit or closure head 1, any fluid which accidentally or otherwise might be carried into the flexible conduit 9 from the tube 11, will be prevented from leaking from said conduit outside the tank, but upon subsidence of the agitation or propelling force will flow back into the tank.

As has been described in our previous application, a cap plate 18 is attached to the closure head 1, to enclose and protect the flexible conduit 9 at its point of emergence from the tank. Surrounding the conduit 9 and engaged beneath the cap plate 18 is a comparatively short link of flexible tubing 19. The protective tubing 19 and conduit 9 are firmly clamped in their adjusted relation with the tank unit or closure head 1 by means of said cap plate 18, and effectually close the orifice to said cap plate. The cap plate 18 is so shaped as to afford about the flexible conduit 9 and adjacent to the oppositely inclined lip 10 of the closure head 1, a cavity or chamber 20, which in the present instance is filled with the fluid tube sealing material as before mentioned. The packing of the conduit tube 9 within the chamber 20 with a body of sealing material 21 effectually closes the conduit passageway through the tank, and hence prevents any fluid being driven through crevices of such passage-way to the exterior of the tank by the agitation or surging of the fluid within the tank.

By providing the anti-surge gland at the lower or free end of the guide tube, and providing for the attachment of the guide tube extension and the flexible portions of said guide conduit without the necessity of exposing the helical core, and hence opening the flexible conduit to the entrance of fluid between the convolutions of the helix and further providing for rendering the envelope or covering of the conduit impervious to the passage of the liquid either or outward therethrough, and the additional provision of the body 21 of packing material about the passageway of the conduit into the tank, all danger of leakage due to the agitation of fluid within the tank is obviated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A fluid gauge wherein the rise and fall of a float within a tank is indicated at a distant point by the to and fro movement of an intermediate reciprocatory flexible member acting through a curvilinear path of travel under the influence of the float, characterized by a tubular guide for the reciprocatory member, a collar loosely surrounding the reciprocatory member bearing upon the end of the tubular guide, a cap enclosing the end of the tubular guide and said collar, and a body of packing material surrounding the reciprocatory member within the cap intermediate the head of the cap and said collar.

2. A fluid gauge wherein the rise and fall of a float within a tank is indicated at a distant point by the to and fro movement of an intermediate reciprocatory flexible member acting through a curvilinear path of travel under the influence of the float, characterized by a flexible tubular guide tube for the reciprocatory member, a nonflexible tubular extension therefor, said nonflexible section being counterbored at one end to receive the end of the flexible guide tube, said counterbored portion being peripherally contracted upon the inserted end of the flexible guide tube substantially as specified.

3. A fluid gauge wherein the rise and fall of a float within a tank is indicated at a distant point by the to and fro movement of an intermediate reciprocatory flexible member acting through a curvilinear path of travel under the influence of the float, characterized by a flexible guide tube for the reciprocatory member, a nonflexible tubular extension therefor into which the end of the flexible tube is inserted, said nonflexible tube being peripherally contracted upon the inserted guide tube.

4. A fluid gauge wherein the rise and fall of a float within a tank is indicated at a distant point by the to and fro movement of an intermediate reciprocatory flexible member acting through a curvilinear path of travel under the influence of the float, characterized by a flexible guide tube for the reciprocatory member, a nonflexible tubular extension therefor into which the end of the flexible tube is inserted, a yielding covering upon said flexible guide tube in which the nonflexible tube extension is embedded by being peripherally contracted thereon.

5. A fluid gauge wherein the rise and fall of a float within a tank is indicated at a distant point by the to and fro movement of an intermediate reciprocatory flexible member acting through a curvilinear path of travel under the influence of the float, characterized by a guide tube for the reciprocatory member comprising a helically wound wire and a fabric envelope therefor, said envelope being impregnated with a fluid proof sealing material.

6. A fluid gauge wherein the rise and fall of a float within a tank is indicated at a distant point by the to and fro movement of an intermediate reciprocatory flexible member acting through a curvilinear path of travel under the influence of the float, characterized by a guide tube for said reciprocatory member extending through the wall of the tank, and a body of fluid proof sealing material surrounding said guide tube adjacent to the point of exit from the tank and sealing the exit opening about said tube.

7. A fluid gauge wherein the rise and fall of a float within a tank is indicated at a distant point by the to and fro movement of an intermediate reciprocatory flexible member acting through a curvilinear path of travel under the influence of the float, characterized by a guide tube for the reciprocatory member, a tank closure through which the guide tube passes, a cap plate overlying the tube adjacent to its point of passage through said closure, and a body of fluid proof sealing material in which said tube is embedded beneath said cap plate.

In testimony whereof, we have hereunto set our hands this 7th day of June, A. D. 1920.

JOHN G. COLLISON.
JOHN W. WRIGHT.
HARRY M. FILBERT.
WALTER FRANK.

Witnesses:
 EDWARD R. MUELLER,
 GEORGE C. HELWIG.